United States Patent
Chung et al.

(10) Patent No.: US 7,277,674 B2
(45) Date of Patent: Oct. 2, 2007

(54) DATA MONITORING SYSTEM AND METHOD USING A SINGLE TIME AXIS WITH TIME INFORMATION PROVIDED BY A GPS RECEIVER

(75) Inventors: Joung-Tae Chung, Gyeonggi-Do (KR); Jin-Soup Joung, Gyeonggi-Do (KR); Jung-Hoon Lee, Seoul (KR)

(73) Assignee: Innowireless Co., Ltd, Seoul (CN)

( * ) Notice: Subject to any disclaimer, the term of this patent is extended or adjusted under 35 U.S.C. 154(b) by 0 days.

(21) Appl. No.: 10/532,884

(22) PCT Filed: Oct. 28, 2003

(86) PCT No.: PCT/KR03/02285

§ 371 (c)(1),
(2), (4) Date: Apr. 27, 2005

(87) PCT Pub. No.: WO2004/038445

PCT Pub. Date: May 6, 2004

(65) Prior Publication Data

US 2006/0099957 A1 May 11, 2006

(30) Foreign Application Priority Data

Oct. 28, 2002 (KR) .................. 10-2002-0065965

(51) Int. Cl.
*H04B 7/185* (2006.01)

(52) U.S. Cl. ............. 455/12.1; 455/135; 455/13.2

(58) Field of Classification Search ............. 455/423, 455/432.1, 456.5, 67.1, 67.4, 456, 427, 12.1, 455/3.02, 67.11, 134, 135, 13.2; 370/310.2, 370/324, 395, 62, 350
See application file for complete search history.

(56) References Cited

U.S. PATENT DOCUMENTS

| | | | | |
|---|---|---|---|---|
| 5,535,193 A | * | 7/1996 | Zhang et al. | 370/253 |
| 6,097,699 A | * | 8/2000 | Chen et al. | 370/231 |
| 6,430,397 B1 | * | 8/2002 | Willrett | 455/67.11 |
| 2003/0100299 A1 | * | 5/2003 | Ko et al. | 455/423 |
| 2004/0203897 A1 | * | 10/2004 | Rogers | 455/456.1 |

FOREIGN PATENT DOCUMENTS

| WO | WO97/06626 | 10/1995 |
|---|---|---|
| WO | WO 02/17561 | 2/2002 |

* cited by examiner

*Primary Examiner*—Edward F. Urban
*Assistant Examiner*—Tu X. Nguyen
(74) *Attorney, Agent, or Firm*—Ohlandt, Greeley, Ruggiero & Perle, L.L.P.

(57) ABSTRACT

A data monitoring system in communication network has the global position system (GPS) receiver, a packet data collecting device and a mobile station-packet data serving node monitoring system (MPMS). The GPS receiver provides time information which is received from the GPS satellites. The packet data collecting device collects the communication protocol and communication environment information between a base station and a packet data serving node (PDSN), together with the time information provided by the GPS receiver. The MPMS receives wireless communication environment, data communication environment and mobile communication protocol of the mobile station together with the GPS time information, and receives packet data communication environment and data communication protocol of the mobile station from the packet data collecting device together with the time information, and monitors and analyzes on a single time axis.

4 Claims, 2 Drawing Sheets

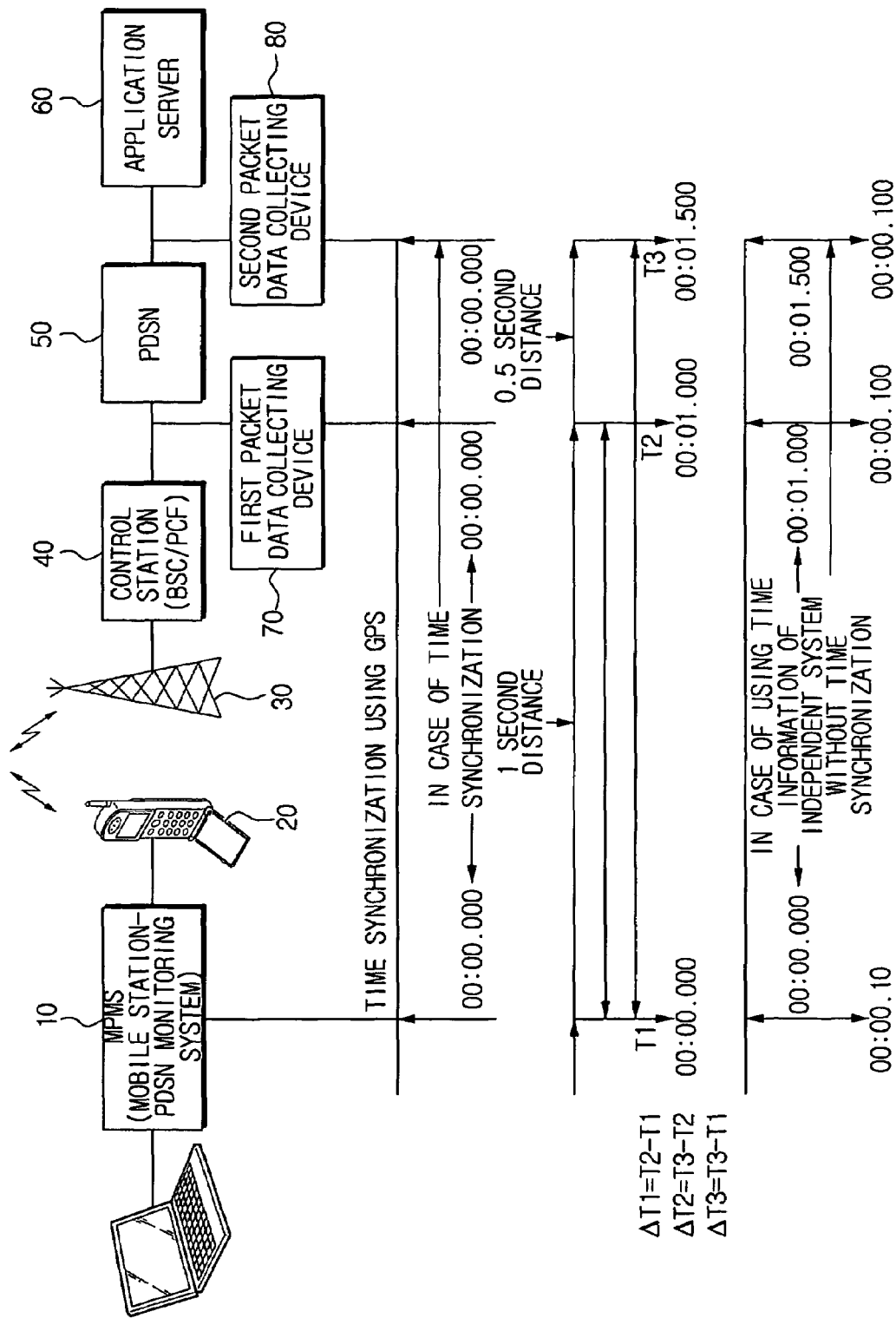

DATA MONITORING SYSTEM AND METHOD USING A SINGLE TIME AXIS WITH TIME INFORMATION PROVIDED BY A GPS RECEIVER

FIELD OF THE INVENTION

The present invention generally relates to a data monitoring system in communication network and a monitoring method thereof, and more specifically, to a data monitoring system in communication network and a monitoring method thereof capable of analyzing a wireless environment and data environment of a mobile communication network and a data communication network on a single time axis by adding time information received from a global position system for the data monitoring of the mobile communication network and the data communication network, respectively.

DESCRIPTION OF THE PRIOR ART

According to the development of the wireless communication technology, a mobile phone becomes low-priced and provides improved speech quality to allow a high-quality speech even in a running vehicle. Therefore, the usage of the mobile phone (hereinafter, refer to as 'mobile station') is greatly increasing.

The mobile station basically communicates with a mobile communication system (hereinafter, refer to as 'mobile communication network'). That is, as a wired network is developed via the Public Switched Telephone Network (PSTN) and the Integrated Services Digital Network (ISDN) to the Asynchronous Transfer Mode (ATM) Broadband-Integrated Services Digital Network (B-ISDN), the mobile network is evolving via the Digital Cellular Network (DCN), which is a voice service, and the Personal Communication Service (PCS) to the next-generation International Mobile Telecommunication (INT-2000) supporting multimedia such as high-speed data, packet, and motion picture.

Currently, the mobile station is being demanded to provide users with data services such as multimedia services or wireless Internet services. The Packet Data Serving Node (PDSN) is a data interchange system (hereinafter, refer to as 'data communication network') to support the data services of the mobile communication network, and is also a required element to provide a very high speed wireless internet services such as 2G, 2.5G, and IMT-2000.

Unlike a router-based system, the PDSN allows use of a Unix server-based system and easy reconfiguration of data backup function and applications so as to provide advantages for the operation of the PDSN. Also, as the PDSN is packaged variously according to the scales, it is feasible to expand the PDSN in a small- or a large-scale server unit.

Meanwhile, it is required to measure the quality of the mobile communication network service by monitoring both the wireless environment and the data environment thereof. It is also required to measure the quality of the data communication network service by monitoring the data environment thereof.

Up to now, the wireless and the data environments have been monitored based on the local clocks of the monitoring equipments in mobile communication networks and data communication networks. In other words, since the clocks of the communication network monitoring equipments are not synchronized, it is not allowed to monitor the quality of the whole network service or to diagnose the reasons of communication failures by associating the mobile communication network and the data communication network or the mobile communication network protocol and the data communication network protocol.

SUMMARY OF THE INVENTION

Accordingly, the object of the present invention is to provide a data monitoring system in a communication system, capable of monitoring and analyzing the wireless environment and the data environment of a mobile communication network and a data communication network on a single time axis by allowing the mobile and data communication networks respectively to receive a time information provided from the global position system (GPS).

To achieve the above object, the data monitoring system in the communication network according to the present invention includes the global position system (GPS) receiver to provide a time information received from the GPS, a first packet data collecting device to collect, together with the time information provided by the GPS receiver, a communication protocol and a communication environment information between a base station supporting a mobile communication service of a mobile station and a packet data serving node (PDSN) supporting a data communication service of the mobile station, and provide the collected information to a system called MPMS, and a mobile station-packet data serving node monitoring system (MPMS) to receive at least one of a wireless communication environment, a data communication environment, and a mobile communication protocol of the mobile station from the mobile station along with the GPS time information, and receive at least one of a packet data communication environment and a data communication protocol of the mobile station from the first packet data collecting device along with the time information, and monitor and analyze the received information on a single time axis.

The data monitoring system also includes a second packet data collecting device to collect at least one of a communication protocol and a communication environment information between the PDSN and an application server along with the time information provided from the GPS receiver, and provide the received information to the MPMS. The MPMS receives at least one of the wireless communication environment, the data communication environment, and the mobile communication protocol of the mobile station from the mobile station along with the GPS receiver, and also collects at least one of the packet data communication environment and the data communication protocol of the mobile station from the second packet data collecting device along with the time information, and monitors and analyzes the received information on a single time axis.

A computing device is also included to receive the communication protocol and the communication environment information from the MPMS and store, monitor, and analyze the received information. The communication protocol and the communication environment information are received from at least one of the mobile station, the first and second packet data collecting devices.

A data monitoring method in a communication network includes a first data communication network monitoring step of collecting at least one of a communication protocol and a communication environment information between a base station supporting a mobile communication service of a mobile station and a packet data serving node (PDSN) supporting a data communication service of the mobile station along with the GPS time information, a mobile communication network monitoring step of collecting at least one of a wireless communication environment, a data communication environment, and a mobile communication protocol of the mobile station along with the GPS time information, and a step of monitoring and analyzing the data collected in the first data communication monitoring step and the mobile communication network monitoring step on a single time axis.

The data monitoring method also includes a second data communication network monitoring step of collecting at least one of a data communication protocol and a packet data communication environment information between the PDSN and an application server along with the GPS time information, and a step of monitoring and analyzing the data collected in the second data communication network monitoring step and the mobile communication network monitoring step on a single time axis.

The method also includes a step of providing a computing device with the data collected in the mobile communication network monitoring step, the first and the second data communication monitoring steps, and storing, monitoring and analyzing the data.

BRIEF DESCRIPTION OF THE DRAWINGS

FIG. 2 is a view showing data monitoring methods of the data monitoring system by time synchronization in a mobile communication network and a data communication network respectively according to the present invention.

DESCRIPTION OF THE PREFERRED EMBODIMENT

Figure 1:
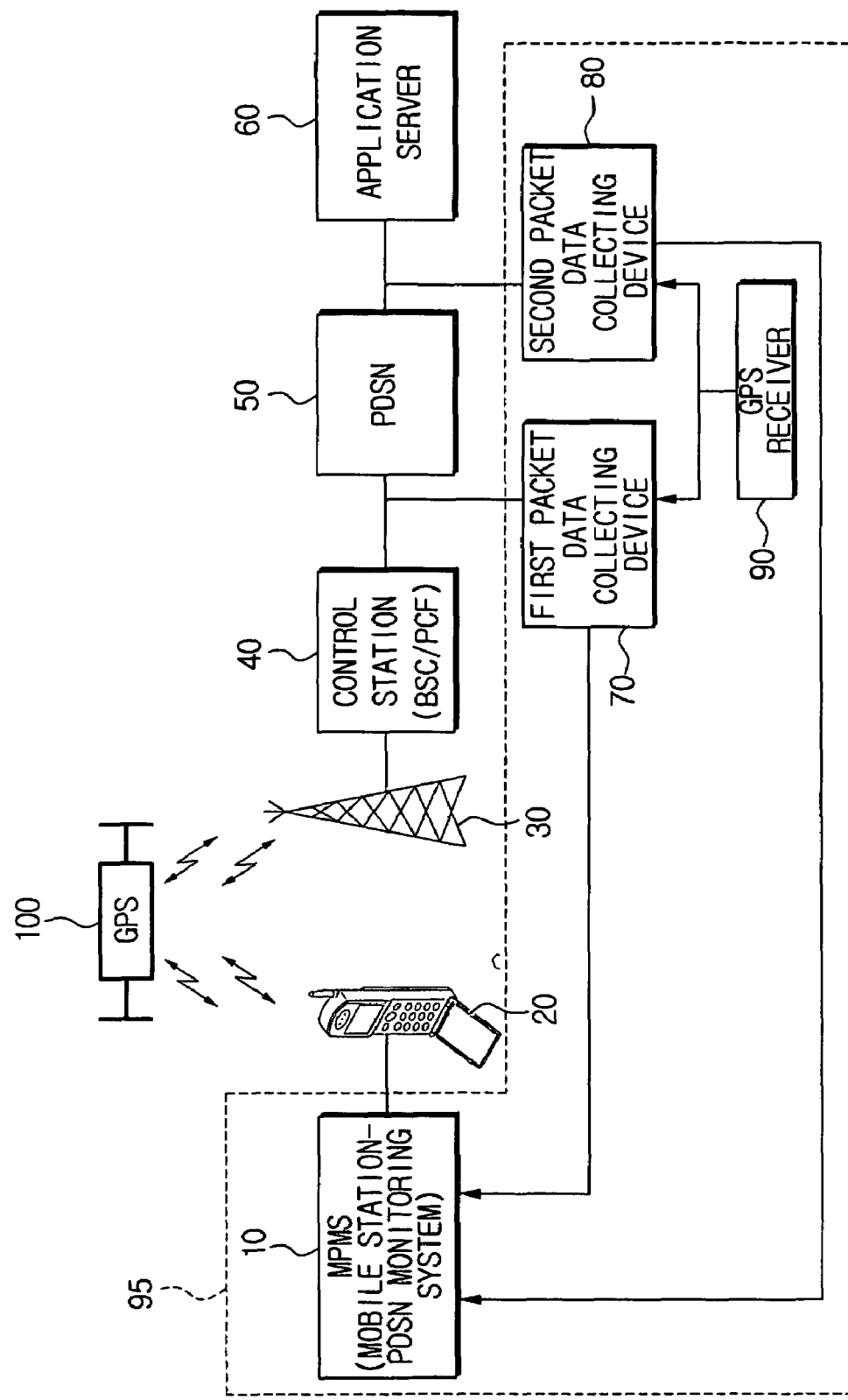
FIG. 1 is a block diagram showing a data monitoring system in a communication network according to an embodiment of the present invention.

FIG. 1 is a block diagram of the data monitoring system and its environment in a communication network according to the present invention, which illustrates a mobile station 20, a base station 30, a control station (BSC/PDF) 40, a PDSN 50, an application server 60, a GPS 100, and the monitoring system 95. The monitoring system 95 includes a mobile station-PDSN monitoring system (hereinafter, refer to as 'MPMS') 10, the first packet data collecting device 70, the second packet data collecting device 80, and the GPS receiver 90 which provides time information received from the GPS 100 to the first and second packet data collecting devices 70, 80.

The mobile station 20 may be a general mobile phone or a mobile phone for testing. The base station 30 and the control station 40 provide communication services in a radio section of the mobile station 20.

The first packet data collecting device 70 collects information on a communication protocol and a communication environment between the control station 40 and the PDSN 50. The second packet data collecting device 80 collects information on a communication protocol and a communication environment between the PDSN 50 and the application server 60.

The MPMS 10 monitors and analyzes the mobile communication protocol of the mobile station 20, and the packet data protocol and the communication environment collected by the first and second packet data collecting devices 70, 80.

The mobile station 20 receives the time information from the GPS 100 through the base station 30. The first and second packet data collecting devices 70, 80 are connected to the GPS receiver 90 so as to receive the time information from the GPS 100. The GPS receiver 90 may be installed in the first and second packet data collecting devices 70, 80, respectively. Accordingly, the mobile station 20 is time-synchronized with the first and second packet data collecting devices 70, 80.

FIG. 2 illustrates data monitoring methods through the time synchronizations in the mobile communication network and the data communication network respectively according to the present invention.

As aforementioned, the data monitoring system in the mobile communication network according to the present invention monitors the wireless environment, the data environment, and the mobile communication protocol of the mobile communication network, and also the data environment and the data communication protocol of the data communication network.

The wireless environment in the mobile communication network may be finger information of the mobile station 20 during the testing, searcher information, CAI (Common Air Interface) message, received power, transmitted power, frame error rate (FER), transmission regulation, received data rate, transmitted data rate, and so on.

The data environment in the mobile communication network may be data throughput (such as RLP, PPP, and FTP), data protocol (such as PPP, IP, TCP, UDP, DNS, and ICMP) capture, data protocol indication, TCP window size, automatic data (FTP, PPP, WAP), voice call generation history, and so on.

The data environment of the PDSN section may be data throughput (such as RLP, PPP, and FTP), data protocol (such as PPP, IP, TCP, UDP, DNS, and ICMP) capture, data protocol (such as PPP, IP, TCP, UDP, DNS, and ICMP) indication, TCP window size, and so on.

As shown in FIG. 2, if the mobile station 20 is time-synchronized with the first and second packet data collecting devices 70, 80 using the GPS 100 and if an event occurs in the mobile station 20 and the first and second packet data collecting devices 70, 80, the mobile station 20 reports to the MPMS 10 the event (i.e., the wireless environment or the data environment and the protocol of the mobile communication network) along with the time information. The first packet data collecting device 70 reports to the MPMS 10 the event (the data environment and the protocol) transmitted and received between the control station 40 and the PDSN 50 along with the time information. The second packet data collecting device 80 also reports to the MPMS 10 the event transmitted and received between the PDSN 50 and the follower 10 (such as the application server 60 of FIG. 1) along with the time information Here, the MPMS 10 itself may store, monitor, and analyze the event. Alternatively, the MPMS 10 connected to the computing device (not shown) may store, monitor, and analyze the data.

As shown in FIG. 2, it is assumed that the MPMS 10 is at a data delay distance of 1 second from the first packet data collecting device 70 and also at a data delay distance of 1.5 seconds from the second packet data collecting device 80. If the first and second packet data collecting devices 70, 80 do not receive the time information which is provided from the GPS 100, from the GPS receiver 90, due to the data delay distances from the MPMS 10, the information transmitted from the first and second packet data collecting devices 70, 80 to the MPMS 10 has an event reception time which is different from the actual event generation time.

However, in case that the mobile station 20 is time-synchronized with the first and second packet data collecting devices 70, 80, the MPMS 10 is capable of obtaining the accurate event generation time regardless of the data delay distance.

Hence, the communication protocol and the communication environment information of the mobile station 20, and the first and second packet data collecting devices 70, 80 are collected in the MPMS 10 on a single time axis to thereby allow the monitoring and the analysis thereon.

As aforementioned, in the data monitoring system in the communication network according to the present invention, the quality or the failure of the wireless data services, which provides services through the interworking of the mobile communication network and the data communication network, can be monitored and diagnosed by using the monitoring the synchronized time information of the GPS. Also, by arraying the generation sequence of the monitored data on the time axis respectively, the quality and the reason of the failures of the mobile communication network and the data communication network through which the wireless data path are monitored and diagnosed accurately to thereby enhance the quality of the wireless data services.

Although a few embodiments of the present invention have been shown and described, the present invention is not limited to the disclosed embodiments. Rather, it would be appreciated by those skilled in the art that changes and modifications may be made in this embodiment without departing from the principles and spirit of the invention, the scope of which is defined by the claims and their equivalents.

INDUSTRIAL APPLICABILITY

According to the present invention, in the data monitoring system and the monitoring method thereof, it is feasible to analyze the wireless environment and the data environment of the mobile communication network and the data communication network on a single time axis by providing time information received from the GPS for the data monitoring of the mobile communication network and the data communication network, respectively.

What is claimed is:

1. A data monitoring system in a communication network comprising:
    a mobile station;
    a base station that communicates with the mobile station;
    a mobile station-packet data serving node monitoring system (MPMS);
    a first packet data collecting device;
    a packet data serving node (PDSN) supporting a data communication service of the mobile station;
    a global position system (GPS) receiver that provides a time information received from the GPS to the first packet collecting device, wherein said mobile station receives the time information from the GPS;
    wherein the first packet data collecting device collects, together with the GPS time information provided by the GPS receiver, a communication protocol and a communication environment information between the base station supporting a mobile communication service of the mobile station and the PDSN, and provides the collected information to the MPMS, wherein the MPMS receives at least one of a wireless communication environment, a data communication environment, and a mobile communication protocol of the mobile station from the mobile station along with the GPS time information, at least one of a packet data communication environment and a data communication protocol of the mobile station from the first packet data collecting device along with the GPS time information, and monitors and analyzes the received information on a single time axis in time synchronization regardless of a time delay due to a distance between the MPMS and the first packet data collecting device; and
    a second packet data collecting device to collect at least one of a communication protocol and a communication environment information between the PDSN and an application server along with the time information provided from the GPS receiver, and provide the received information to the MPMS, wherein the MPMS receives at least one of the wireless communication environment, the data communication environment, and the mobile communication protocol of the mobile station from the mobile station along with the time information of the GPS receiver, receives at least one of the packet data communication environment and the data communication protocol of the mobile station from the second packet data collecting device along with the time information, and monitors and analyzes the received information on a single time axis.

2. The system of claim 1, further comprising a computing device to receive the communication environment information and the communication protocol via the MPMS and store, monitor, and analyze the received information, the communication protocol and the communication environment information being received from at least one of the mobile station, the first and second packet data collecting devices.

3. A data monitoring method in a communication network comprising:
    a first data communication network monitoring step of collecting at a first location at least one of a communication protocol and a communication environment information between a base station supporting a mobile communication service of a mobile station and a packet data serving node (PDSN) supporting a data communication service of the mobile station along with a global position system (GPS) time information received at the first location;
    a mobile communication network monitoring step of collecting at least one of a wireless communication environment, a data communication environment, and a mobile communication protocol of the mobile station along with the GPS time information received by the mobile station at a second location;
    a step of monitoring and analyzing the data collected in the first data communication monitoring step and the mobile communication network monitoring step on a single time axis in time synchronization regardless of a time delay due to a distance between the first and second locations;
    a second data communication network monitoring step of collecting at least one of a data communication protocol and a packet data communication environment information between the PDSN and an application server along with the GPS time information; and
    a step of monitoring and analyzing the data collected in the second data communication network monitoring step and the mobile communication network monitoring step on a single time axis.

4. The method of claim 3, further comprising a step of providing a computing device with the data collected in the mobile communication network monitoring step, the first and the second data communication monitoring steps, and storing, monitoring and analyzing the data.

* * * * *